United States Patent
Cota-Robles et al.

(10) Patent No.: US 6,631,429 B2
(45) Date of Patent: Oct. 7, 2003

(54) REAL-TIME PROCESSING OF A SYNCHRONOUS OR ISOCHRONOUS DATA STREAM IN THE PRESENCE OF GAPS IN THE DATA STREAM DUE TO QUEUE UNDERFLOW OR OVERFLOW

(75) Inventors: Erik C. Cota-Robles, Portland, OR (US); Barry O'Mahony, Banks, OR (US); Alberto J. Martinez, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/471,942

(22) Filed: Dec. 23, 1999

(65) Prior Publication Data

US 2003/0070012 A1 Apr. 10, 2003

(51) Int. Cl.[7] .............................................. G06F 13/00
(52) U.S. Cl. ............................. 710/52; 710/18; 710/53; 710/55; 710/56; 710/57; 710/61; 711/744; 711/775; 370/235; 370/360; 370/394
(58) Field of Search ............................... 710/53, 55, 56, 710/57, 18, 61, 52; 370/235, 360, 394; 711/744, 775

(56) References Cited

U.S. PATENT DOCUMENTS

| 5,107,457 A | * | 4/1992 | Hayes et al. ................. 711/132 |
|---|---|---|---|
| 5,710,785 A | * | 1/1998 | Yagi ............................. 714/789 |
| 5,721,830 A | | 2/1998 | Yeh et al. ..................... 709/237 |
| 5,740,173 A | * | 4/1998 | Fiorini ......................... 370/394 |
| 5,819,114 A | * | 10/1998 | Behnke ........................ 710/57 |
| 5,841,771 A | * | 11/1998 | Irwin et al. .................. 370/360 |
| 5,892,980 A | * | 4/1999 | Tal et al. ....................... 710/56 |
| 5,940,459 A | * | 8/1999 | Hsu et al. ..................... 375/377 |
| 6,219,339 B1 | * | 4/2001 | Doshi et al. ................. 370/235 |
| 6,429,902 B1 | * | 8/2002 | Har-Chen et al. ........... 348/518 |

FOREIGN PATENT DOCUMENTS

| GB | 2275851 | * | 9/1994 |
|---|---|---|---|
| JP | 403241584 A | * | 10/1991 |
| JP | 410098475 A | * | 4/1998 |

* cited by examiner

Primary Examiner—Jeffrey Gaffin
Assistant Examiner—Tammara Peyton
(74) Attorney, Agent, or Firm—Blakely, Sokoloff, Taylor & Zafman LLP (57) ABSTRACT

In one embodiment of the present invention, an output device sends a spurious data sample in place of a first data sample to be sent from a queue if the queue is in a state of underflow during which the first data sample is not available to be sent. The buffer is to store data samples for an isochronous data transmission. Circuitry skips the first data sample when the first data sample becomes available in the queue so that synchronization for subsequent data samples sent from the queue is preserved. In another embodiment of the present invention, an input device advances an input buffer pointer to point to a next location in a memory in response to receiving a data sample at a queue during a state of overflow. The input buffer pointer indicates a location in the memory to which a next data sample is to be sent from the queue. The queue stores data samples for an isochronous data transmission. By advancing the input buffer pointer, synchronization for subsequent data samples is preserved.

32 Claims, 11 Drawing Sheets

Storage Medium   1110

Machine Executable
Instructions
1125

FIG. 11

REAL-TIME PROCESSING OF A SYNCHRONOUS OR ISOCHRONOUS DATA STREAM IN THE PRESENCE OF GAPS IN THE DATA STREAM DUE TO QUEUE UNDERFLOW OR OVERFLOW

FIELD OF THE INVENTION

The present invention pertains to the field of real-time processing of synchronous or isochronous data streams. More particularly, this invention relates to real-time processing of a synchronous or isochronous data stream in the presence of gaps in the data stream due to queue underflow or overflow.

BACKGROUND OF THE INVENTION

In the field of data processing, "real-time" means that data that is available for processing at one predesignated time shall be completely processed by another predesignated time. A time-dependent sequence of data is commonly referred to as a "data stream" where packets of data are transmitted from a sender to a receiver and are processed in sequence and in the same or a complementary manner at each endpoint. A synchronous data stream is one where the two endpoints share a common clock. An isochronous data stream is one where the two endpoints have equal, though not necessarily the same, clocks.

One example of a synchronous real-time data stream is data transmission between two modems. When transmitting data, a modem encodes digital data into an analog waveform at a particular real-time rate. A receiving modem decodes the analog waveform at a particular real-time rate to recover the digital data. Any interference with a real-time data stream may result in errors. For instance, a data transmission between two modems includes at least one training period. During a training period, the modems agree on various transmission parameters. Barring renegotiation, the modems rely on the agreed upon parameters to accurately send and receive data. If one modem fails to send data on time or drops data, synchronization between the two modems may be lost, rendering subsequent data unrecoverable.

Data queues are one source of potential failures in a real-time data stream. For instance, a transmitting modem may store data in an output queue prior to transmitting the data at a constant rate. If the modem transmits data faster than it stores data to the output queue, the output queue will underflow and cause an error in the data stream.

Conversely, a receiving modem receives data at a constant rate and may store the data in an input queue prior to further processing. If data are stored to the input queue faster than they are read from the input queue, the input queue will overflow and cause an error in the data stream.

Queue underflow and overflow are of particular concern when processing synchronous and isochronous data streams. This is because these data streams assume a reliable constant rate of service per unit of time. Queue underflow and overflow cause gaps in both synchronous and isochronous data streams and, depending upon the application, may substantially impact performance. For instance, modems may have to "retrain," taking time to agree upon transmission parameters. The modems may also have to re-send un-recovered data. With data transmission rates on the order of tens or even hundreds of thousands of bits per second, wasting several seconds to re-establish communications is very costly in terms of performance.

Various techniques have been used to decrease the likelihood of gaps in synchronous data streams due to queue underflow and/or overflow. For instance, the size of the queues can be increased. Increasing the queue size, however, has the obvious disadvantage of using larger amounts of limited storage resources, and can be quite expensive. Furthermore, increasing the size of the queues can also increase the end-to-end delay, which is disadvantageous for certain classes of applications, including modems.

In another approach, as discussed in U.S. Pat. No. 5,721, 830 issued to Yeh et al., data underflow is remedied by storing data in a circular buffer so that if new data is not available on time, old data can be reused. This type of approach is only applicable where re-using old data is preferable to sending no data at all, and has no application whatsoever to data overflow.

SUMMARY OF THE INVENTION

In one embodiment of the present invention, an output device sends a spurious data sample in place of a first data sample to be sent from a queue if the queue is in a state of underflow during which the first data sample is not available to be sent. The buffer is to store data samples for an isochronous data transmission. Circuitry skips the first data sample when the first data sample becomes available in the queue so that synchronization for subsequent data samples sent from the queue is preserved.

In another embodiment of the present invention, an input device advances an input buffer pointer to point to a next location in a memory in response to receiving a data sample at a queue during a state of overflow. The input buffer pointer indicates a location in the memory to which a next data sample is to be sent from the queue. The queue stores data samples for an isochronous data transmission. By advancing the input buffer pointer, synchronization for subsequent data samples is preserved.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention maintains synchronization in a real-time data stream even in the presence of gaps in a data stream due to queue underflow and/or overflow. In general, the present invention employs various techniques to "walk" through an input queue or an output queue at a constant rate, whether or not data is available in an output queue or whether or not space is available in an input queue. Various embodiments and examples are discussed more fully below.

Figure 1:
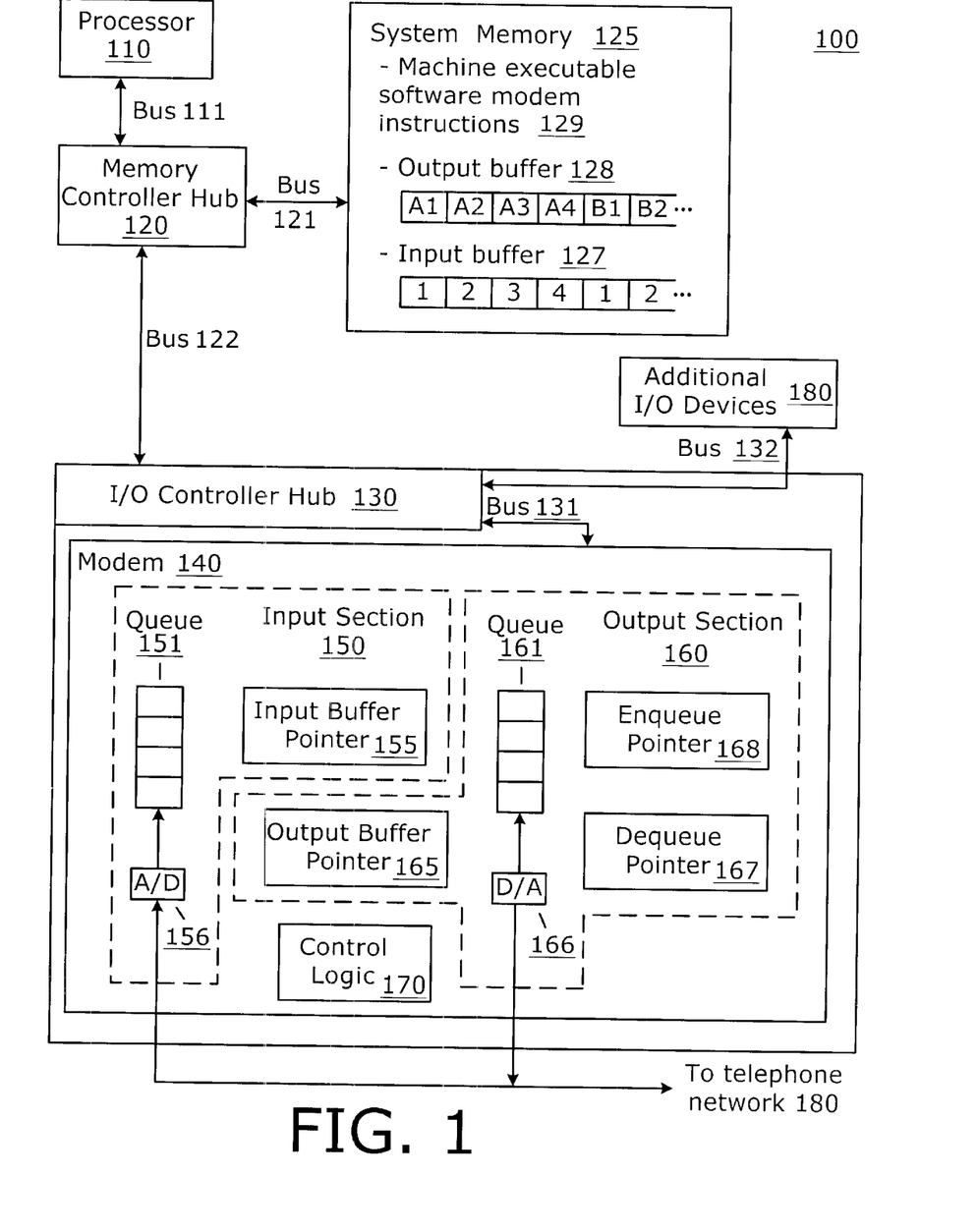
FIG. 1 illustrates one embodiment of the present invention in a computer system.

FIG. 1 illustrates one embodiment of a computer system 100 according to the teachings of the present invention. Computer system 100 includes a processor 110, memory controller hub 120 (a.k.a., the "North Bridge"), system memory 125, input/output (I/O) controller hub 130 (a.k.a., the "South Bridge"), a software modem card 140 and additional I/O devices 180 coupled via buses 111, 121, 122, 131, and 132 as shown.

Except for the teachings of the present invention as discussed below, computer system 100 represents any of a wide range of computer systems, internet appliances, set-top boxes, etc. Those skilled in the art will recognize that alternate embodiments of computer system 100 may not include all of the elements shown in FIG. 1, may be coupled in any of a variety of configurations, including configurations where one or more elements are integrated within another element, and may include additional elements, such as additional processors, memories, buses, etc. Also, those skilled in the art will recognize that I/O devices 180 may represent any of a broad category of devices including additional buses and bus bridges, a display device, a keyboard, a mouse, a disk drive, etc.

Computer system 100 is configured with a software modem including machine executable software modem instructions 129 stored in system memory 125 and modem card 140 attached to I/O controller hub 130. A software modem is one example of an application that makes use of synchronous real-time data streams. As discussed above, the presence of gaps in synchronous or isochronous data streams due to queue nderflow and/or overflow is of particular concern.

In general, when transmitting data, a modem groups one or more consecutive bits of digital data into a symbol. A symbol is encoded into an analog waveform having a particular phase and amplitude. The symbol can be encoded using, for example, Phase Modulation or Quadrature Amplitude Modulation. A receiving modem decodes the received analog waveform using the same modulation scheme (e.g., Quadrature Amplitude Modulation) in order to recover the encoded symbol that represents the consecutive bits of digital data.

The number of bits grouped into a symbol depends upon the modulation scheme used and is generally greater than one. In which case, the effective transmission rate in bits per second (bps) is generally considerably higher than the rate at which symbols (or code signals) are transmitted (i.e. the baud rate).

In the transmitting modem, the analog waveform is generated by delivering a sequence of data samples (or modulation samples) to a digital-to-analog converter. The data samples represent the sampled amplitude for the encoded analog waveform. Typically, for a given modem, a given modulation scheme, and a given set of modem parameter values, there is a fixed number of multiple "data samples" for each symbol, such as four data samples per symbol.

Conversely, in the receiving modem, an analog-to-digital converter generates data samples representing the received analog waveform. Such received data samples are also generated at some synchronous, fixed rate of multiple samples per symbol. The number of samples per symbol at the receiving modem may or may not be the same number of samples per symbol used in the transmitting modem.

As discussed above, if one modem underflows, and fails to send a data sample on time or drops a sample, synchronization between the two modems may be lost, rendering subsequent data unrecoverable. For instance, if one or more data samples of the next symbol to be transmitted in the data stream are not available on-time, one or more samples representing all or part of a previously encoded symbol may be retransmitted in place of the missing sample(s). In which case, the symbol for which samples were unavailable will be incorrectly decoded resulting in incorrect digital data. Worse still, even when the missing samples subsequently become available and are transmitted, all data subsequent to the underflow condition will be decoded incorrectly because all the subsequent samples will be "timeshifted" out of place in the real-time data stream. This "out-of-phase" condition will continue until the error is detected. Furthermore, if the number of retransmitted samples is not equal to the number of samples per symbol, then the receiving modem may lose "symbol clock" due to the unexpected number of samples, which will very likely trigger a modem retrain.

Referring again to FIG. 1, when software modem instructions 129 are executed by processor 110, outgoing packets of binary data (i.e. symbols) are encoded and stored as a series of modulation samples in output buffer 128 in system memory 125 with multiple samples per symbol. These modulation samples are sent over buses 121, 122, and 131 to output section 160 in software modem card 140 where the modulation samples are stored in queue 161 prior to transmission. The modulation samples can be moved from system memory 125 to queue 161 through any number of system operations including direct memory access at the request of the software modem card 140, read and write operations performed by processor 110, etc. The modulation samples are read from output queue 161 at a constant rate, converted to an analog signal by digital to analog (D/A)

converter 166, and transmitted at a constant rate to a remote modem (not shown) over telephone network 180.

If processor 110 is simultaneously performing a number of other tasks, both real-time and non-real-time, then encoding new modulation samples of output data may be delayed for an extended period of time, resulting in output buffer 128 being unable to provide modulation samples upon request. Also, if other devices share access to buses 121 and 122, bus contentions may delay modulation samples from being moved from output buffer 128 to output queue 161. Since output queue 161 is drained at a constant rate, modulation samples may therefore not be available when they are needed for transmission, causing a queue underflow condition.

Conversely, analog data is received from the remote modem (not shown) at analog to digital (A/D) converter 156 over telephone network 180 at a constant rate and stored as modulation samples in queue 151 of input section 150. The modulation samples are then sent over buses 131, 122, and 121 to system memory 125 and stored as input data in input buffer 127. Thus, input buffer 127 contains the incoming data stream, which consists of modulation samples which must subsequently be decoded by processor 110 to yield packets of binary data. As with output data, modulation samples can be moved by processor operations, direct memory accesses, etc. Queue 151 receives samples at a constant rate, but samples are read from queue 151 at a variable rate that depends upon system activity in general, and bus activity in particular. As a result, queue 151 may not have space available to store additional modulation samples when new modulation samples are received, resulting in an overflow condition.

The risk of overflow and/or underflow conditions increases as the size of queues 151 and 161 is reduced. Physical space is very limited in many integrated circuit designs for peripheral devices and therefore the size of input and output queues is frequently very constrained. For instance, in one embodiment, peripheral device 140 (the software modem card) is implemented as an integrated set of gates on the I/O controller hub 130 itself, with buffers 151 and 161 only large enough to store four modulation samples. In which case, the margin for delay due to contention for system resources such as the data bus is exceptionally small.

Figure 2:
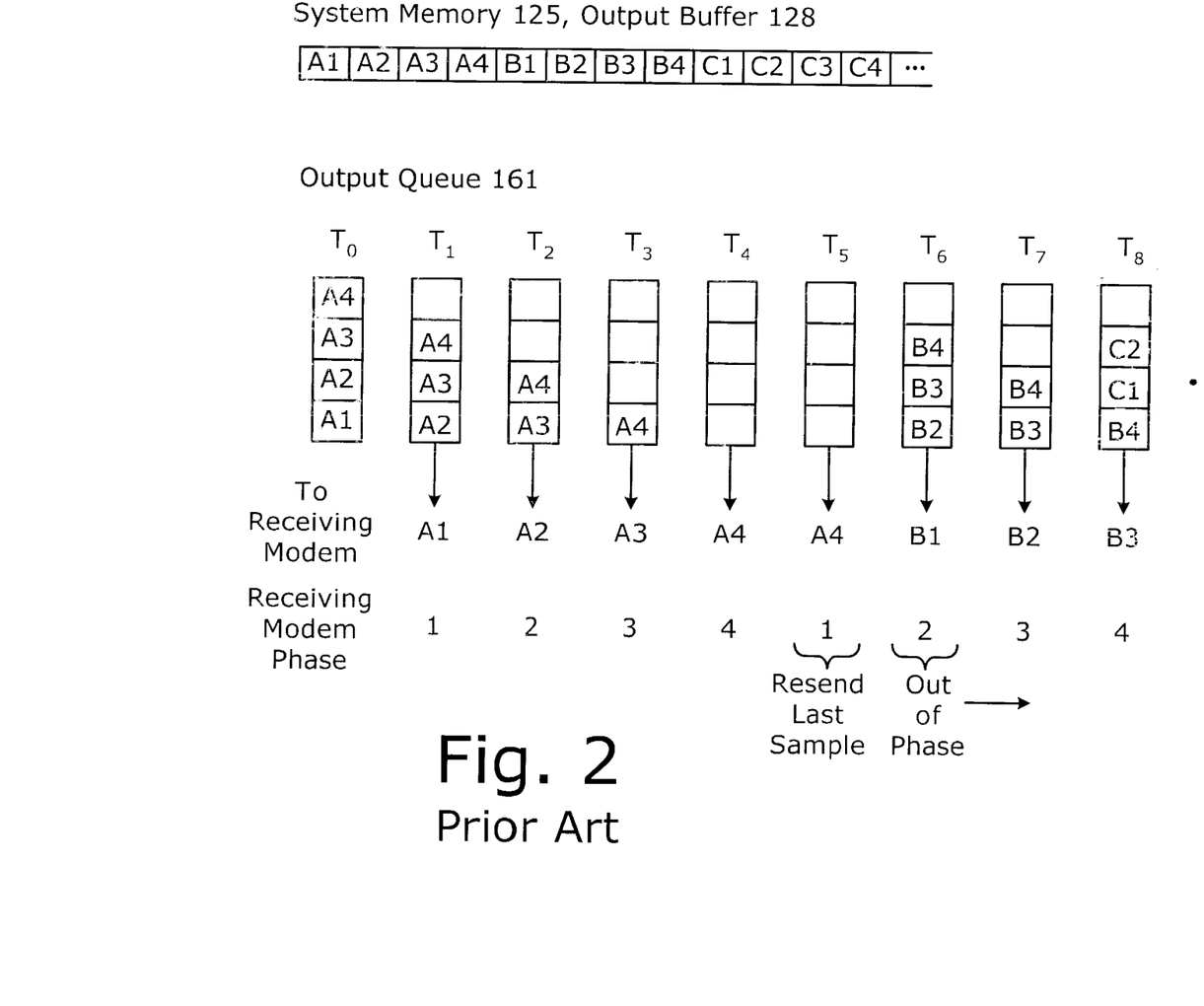
FIG. 2 illustrates one embodiment of a prior art queue underflow condition.

FIG. 2 illustrates one embodiment of a queue underflow condition according to the prior art. A string of encoded output data consisting of encoded modulation samples is stored in output buffer 128 in system memory 125. At time $T_0$, four modulation samples representing a symbol "A" have been stored to output queue 161. Thus, in this embodiment, the data sample rate is four times the symbol rate. At time $T_1$, sample A1 is sent to the receiving modem (not shown) so as to arrive in the time frame during which the receiving modem is expecting the start of a symbol. The storage element previously occupied by sample A1 becomes available to store a new modulation sample. For each time interval, another sample is sent. As storage elements become available, new modulation samples are requested from system memory 125.

As shown in FIG. 2 however, at time $T_4$, modulation sample A4 is being sent but no new modulation samples have arrived due to a delay of some sort upstream of queue 161. At time $T_5$, the modem needs to send another sample of data from queue 161 but no new sample is available. In which case, in the illustrated embodiment, the contents of the last storage element are resent, modulation sample A4, during a time frame when a modulation sample for the beginning of the next symbol should have been sent. Re-sending modulation sample A4 constitutes a gap in the synchronous data stream. In an alternate embodiment, the prior art may send a fixed modulation sample value (i.e., zero) at time $T_5$, which also constitutes a gap in the synchronous data stream.

Continuing with FIG. 2, the system processor is fast enough to process many samples during the interval between sample transmissions, provided of course that it is not otherwise busy. Thus between time $T_5$ and time $T_6$, four new encoded modulation samples are received from system memory 125—modulation samples B1 through B4, corresponding to symbol "B." In which case, at time $T_6$, data transmission continues with modulation sample B1, followed by modulation sample B2 at time $T_7$, modulation sample B3 at time $T_8$, and so on. Between time $T_7$ and $T_8$, two additional modulation samples C1 and C2, corresponding to the first half of symbol "C," are received as part of the normal process of refilling output queue 161.

The gap in the synchronous data stream occurred at time $T_5$, where modulation sample A4 representing the last sample in symbol "A" was sent during a time corresponding to the beginning of symbol "B." From that point on, the data stream is out of phase in that the receiving modem will decode samples in the wrong symbol periods. None of the subsequent data will be decoded properly. A comparatively large amount of unrecoverable data may be transmitted before the error is detected. When the error is detected, the modems may have to retrain, and the data may need to be resent.

Figure 3:
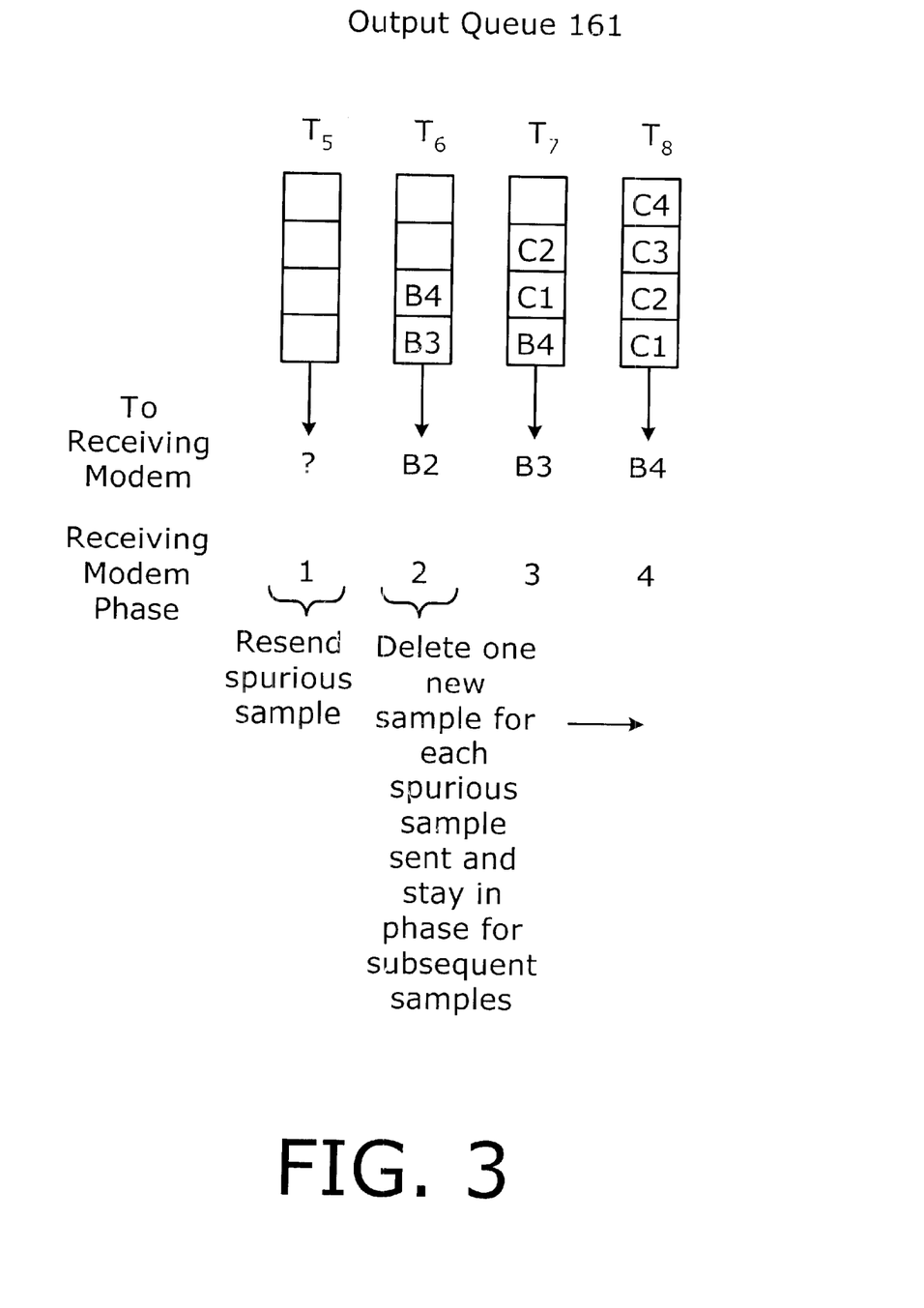
FIG. 3 illustrates one embodiment of the present invention for queue underflow.

FIG. 3 illustrates one embodiment of the present invention. In FIG. 3, picking up from FIG. 2 at time $T_5$, an arbitrary modulation sample (i.e., spurious data) is sent when the buffer is in a condition of underflow. For modems, spurious data can be almost anything, such as a previously sent modulation sample, which in this case would be a duplicate transmission of modulation sample A4, or a sample that is selected or generated on the fly. In either case, the spurious data will likely appear to be line noise to the receiving modem.

In various embodiments in which spurious data is something other than data previously stored in the buffer or an additional storage element (not shown), the spurious data can be selected or generated on the fly by, for instance, control logic 170. Any number of approaches can be taken to generate spurious data on the fly including multiplexing the input lines to D/A converter 166 to ground in order to send zeros or to a voltage source to send ones.

As illustrated in FIG. 3, for each modulation sample of spurious data that is sent, one new modulation sample of data is deleted from the synchronous data stream when new modulation samples are received. In which case, synchronization is maintained for subsequent modulation samples. For instance, in FIG. 3, when new modulation samples of data are received in the time between $T_5$ and $T_6$, the first new modulation sample B1 is deleted corresponding to the one modulation sample of spurious data that was sent. So, modulation sample B2 is sent at time $T_6$, thereby maintaining synchronization between the two modems.

Figure 4:
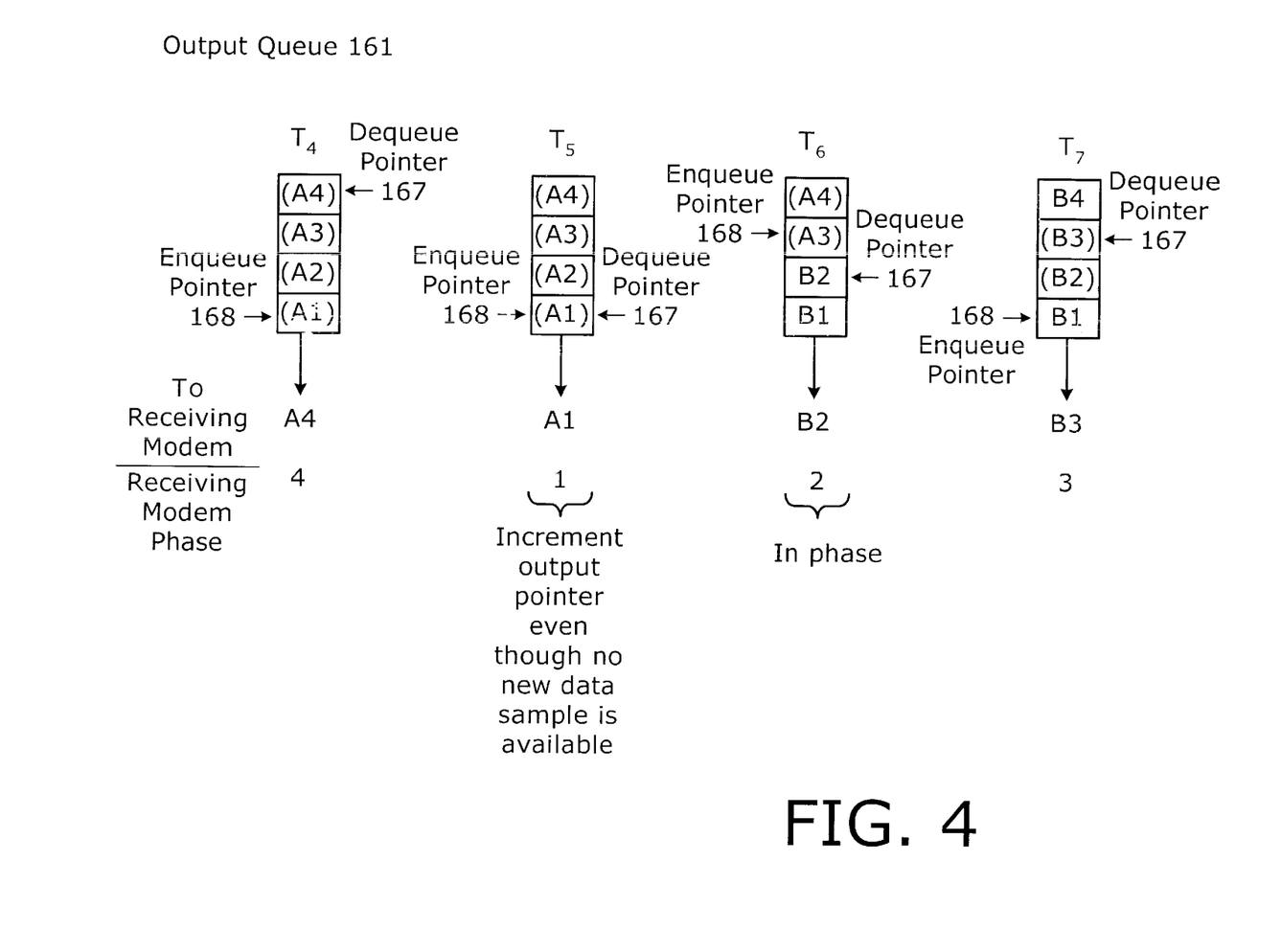
FIG. 4 illustrates one embodiment of the present invention using a circular buffer, an enqueue pointer, and a dequeue pointer.

FIG. 4 illustrates one embodiment of how a new modulation sample of data is deleted for each spurious modulation sample sent. In the embodiment of FIG. 4, queue 161 is a circular buffer with two associated pointers. Enqueue pointer 168 points to the storage element in the circular buffer to which new modulation samples will be copied upon arrival via bus 131, and is incremented immediately after each sample is copied into queue 161. Dequeue pointer 167 points to the last storage element in the circular buffer from which a modulation sample was sent and is therefore incremented before a sample is removed from queue 161. So, for instance, picking up from FIG. 2 at time $T_4$, enqueue pointer 168 points to the storage location containing sample A1 while dequeue pointer 167 points to the storage location that stores modulation sample A4. Sample A4 is currently being sent to the receiving modem. Modulation samples which have already been sent, or are currently being sent, are shown in parentheses.

At time $T_5$, even though no new modulation samples have arrived, dequeue pointer 167 is incremented and a modulation sample is dequeued from the next storage location even though the data is spurious. In the illustrated embodiment, the spurious data that is sent is modulation sample A1. Between time $T_5$ and $T_6$, new modulation samples B1 and B2 arrive and are enqueued, and enqueue pointer 168 is incremented to point to sample A3. At time $T_6$ however, dequeue pointer 167 is incremented again so that modulation sample B1 is skipped and modulation sample B2 is sent. Sample B2 will thus be decoded by the receiving modem as the second sample in a symbol interval, thereby maintaining synchronization between the two modems. Between time $T_6$ and $T_7$, new modulation samples B3 and B4 arrive and are enqueued, and enqueue pointer 168 is incremented to point to sample B1. At time $T_7$, dequeue pointer 167 is incremented again and modulation sample B3 is sent.

In an alternate embodiment, control logic 170 can detect the underflow condition in any number of ways, such as by comparing the value of dequeue pointer 167 to the value of enqueue pointer 168. In response to detecting the underflow condition, control logic 170 can prevent dequeue pointer 167 from being incremented at time $T_5$ so that modulation sample A4 is resent rather than modulation sample A1. Then, at time $T_6$ control logic 170 can increment dequeue pointer 167 twice so that modulation sample B1 is skipped and modulation sample B2 is sent. If more than one spurious modulation sample is sent, control logic 170 can count the number of spurious modulation samples sent until new modulation samples are received and then increment dequeue pointer 167 for each spurious modulation sample.

In another alternate embodiment, control logic 170 detects the underflow condition and multiplexes predefined spurious data into D/A converter 166, as discussed above, and increments dequeue pointer 167 for each modulation sample of spurious data sent.

Figure 5:
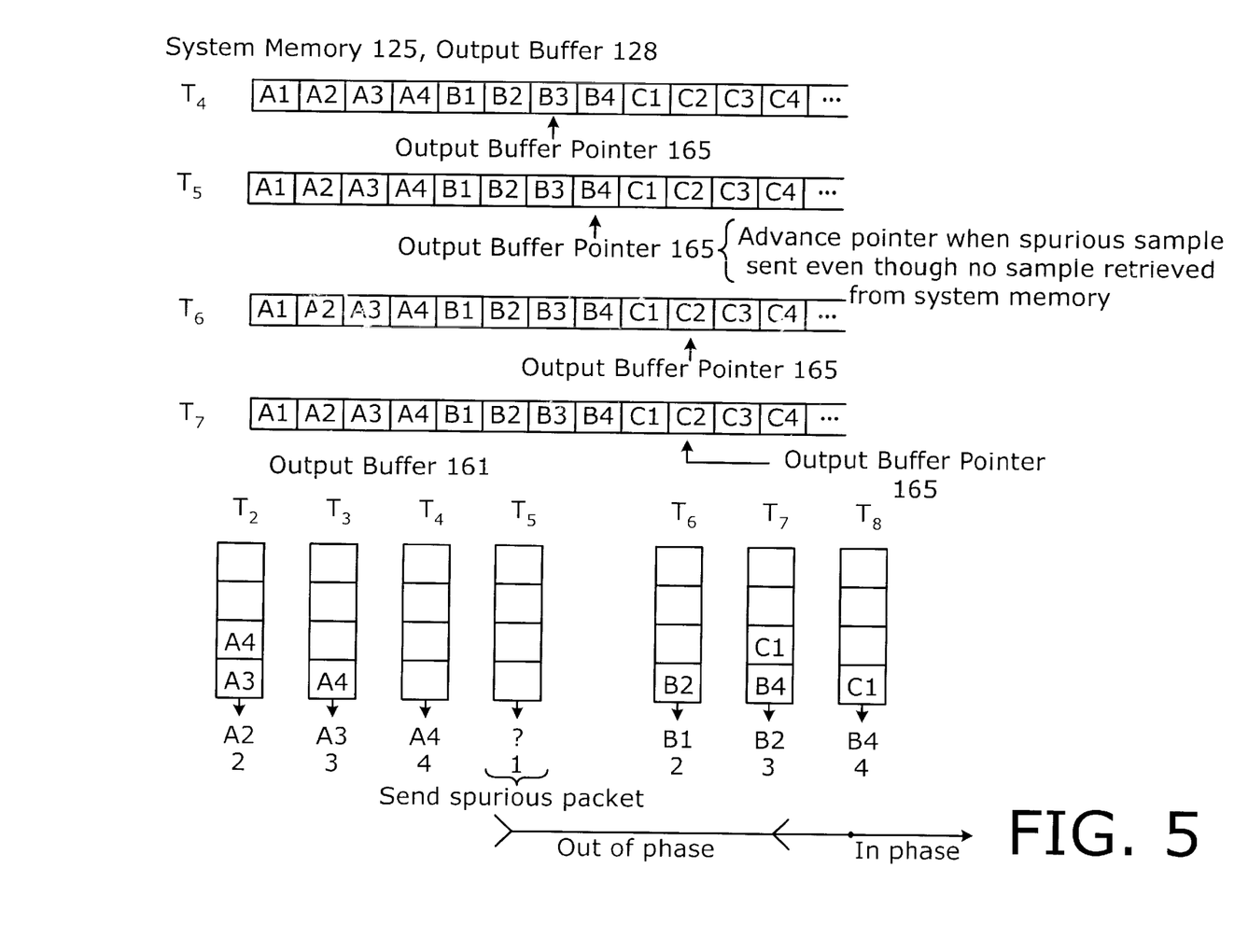
FIG. 5 illustrates one embodiment of the present invention using an output buffer pointer.

FIG. 5 illustrates another embodiment of how a subsequent modulation sample of data is deleted for each spurious modulation sample sent. In the embodiment of FIG. 5, modem card 140 performs direct memory accesses (DMAs) to system memory 125 based on output buffer pointer 165. That is, when space is available in queue 161 and new modulation samples of output data are requested from output buffer 128 in system memory 125, output buffer pointer 165 points to the location in system memory 125 from which the next modulation sample of data should be retrieved. In the illustrated embodiment, control logic 170 initiates a DMA transfer equal in size to two modulation samples whenever output queue 161 becomes half-empty. This can occur in two ways: 1) when the number of samples in the queue transitions from three to two (e.g., at time $T_2$) or 2) when two samples are received by an empty queue (e.g., at time $T_6$).

Picking up from FIG. 2 at time $T_4$, the last modulation sample A4 is sent and output buffer pointer 165 is pointing to B3 because a DMA transfer was initiated for samples B1 and B2 at time $T_2$. If buses 121, 122, and 131 were able to complete the transfer of samples B1 and B2 in time (i.e., before time $T_5$) then modulation sample B1 would be the next modulation sample to be dequeued and transmitted. At time $T_5$ however, queue 161 is in an underflow condition due to some delay in completing the DMA transfer of samples B1 and B2.

A spurious modulation sample is sent at time $T_5$ in any number of ways, such as those discussed above. Whenever a spurious modulation sample is sent, control logic 170 increments output buffer pointer 165 by one modulation sample size. Likewise, whenever a DMA transfer is initiated, control logic 170 increments output buffer pointer 165 two modulation sample sizes, which is the size of the transfer. Together these two policies maintain synchronization although several samples may be sent "out of phase" before synchronization is reestablished, as is explained below and illustrated in FIG. 5.

At time $T_5$, a spurious modulation sample is transmitted and therefore control logic 170 increments output buffer pointer 165 to point to modulation sample B4. Between time $T_5$ and $T_6$, modulation samples B1 and B2 are retrieved and therefore a new DMA transfer is initiated by control logic 170 for two samples beginning with sample B4 (i.e., B4 and C1). Thus, sample B3 has been skipped. As a result, at time $T_6$, modulation sample B1 is sent "out of phase," and, at time $T_7$, sample B2 is sent "out of phase." As shown in FIG. 5, between time $T_6$ and $T_7$, modulation samples B4 and C1 are retrieved, and thus, at time $T_8$, sample B4 is sent "in phase," sample B3 having been skipped as previously noted. In which case, synchronization is restored in the data stream.

Figure 6:
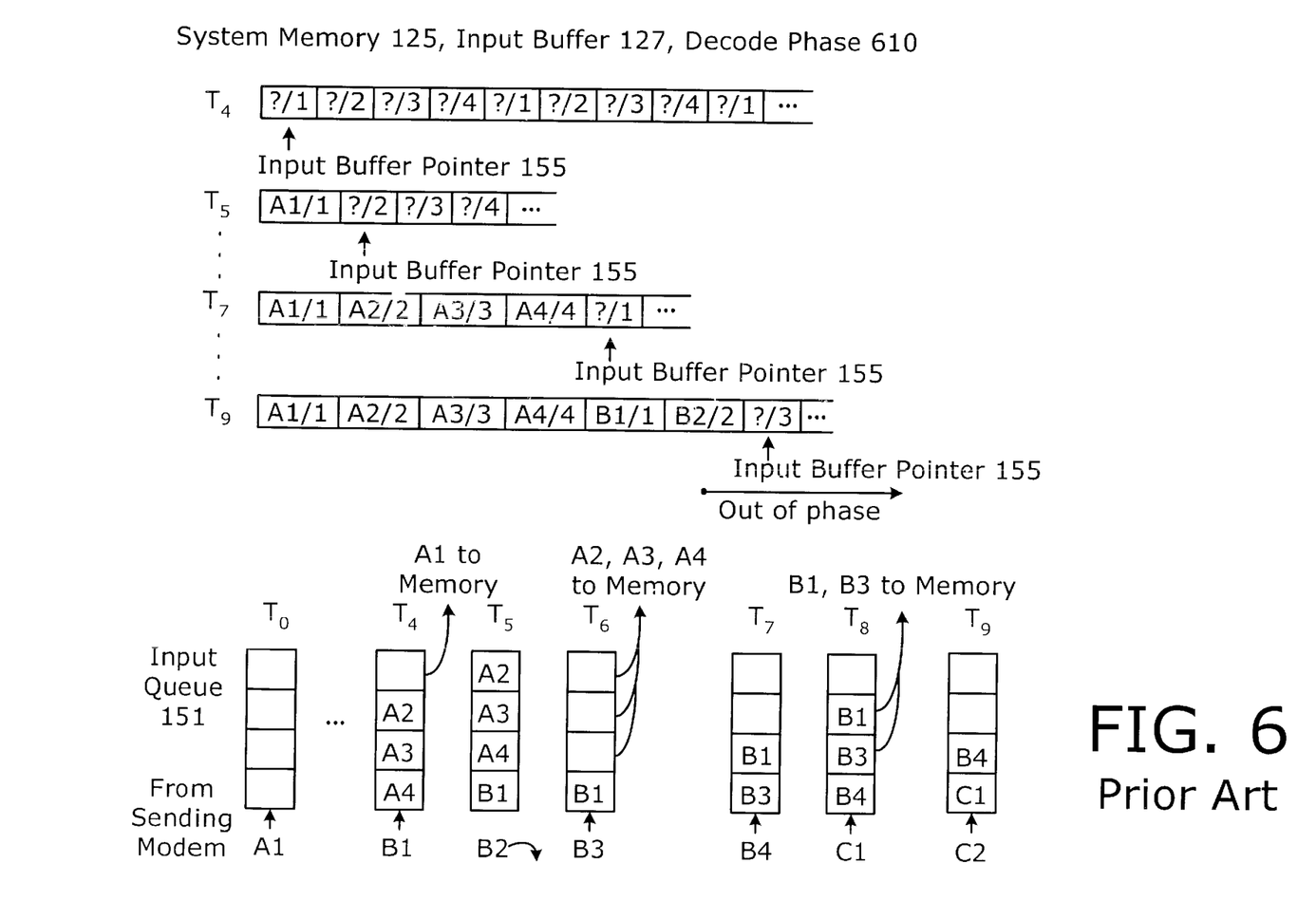
FIG. 6 illustrates one embodiment of a prior art queue overflow condition.

FIG. 6 illustrates one embodiment of a buffer overflow condition according to the prior art. The position of a sample with respect to its place within a symbol interval is referred to as a "decode phase". In the illustrated embodiment, system memory 125 includes input buffer 127 to store input data. Processor 110 decodes the modulation samples located in input buffer 127 in a decode phase dependent manner depending on memory location. For instance, each memory location has associated with it a decode phase 610. A modulation sample decoded in phase position one is followed by a modulation sample decoded in phase two, and so on, repeatedly cycling through all of the decode phases for the particular modulation scheme. For the illustrated modulation scheme, there are four decode phases corresponding to four data samples per symbol.

At time $T_0$, input queue 151 begins to receive a synchronous data stream beginning with modulation sample A1. By time $T_4$, modulation sample A1 has been sent to a location in system memory 125 indicated by input buffer pointer 155, making room in queue 151 for modulation sample B1. At time $T_5$, modulation sample A1 has reached system memory 125 and input buffer pointer 155 has been incremented to point to the next available storage location. Modulation sample A1 was encoded in phase one, and it is stored in a memory location so that it will be decoded in phase one as well. Meanwhile, queue 151 is in a state of overflow when modulation sample B2 arrives at time $T_5$. In the illustrated embodiment, modulation sample B2 is dropped. In alternate embodiments, modulation sample B2 may overwrite a previously stored modulation sample in buffer 151. In either case, the overflow causes a gap in the data stream.

By time $T_6$, modulation samples A2, A3, and A4 have been sent to system memory 125 to be stored in storage locations indicated by input buffer pointer 155. For each modulation sample sent, input buffer pointer 155 is advanced to point to the next available storage location. Having sent modulation samples A2, A3, and A4 to system memory 125, plenty of storage space is available in input queue 151 for modulation sample B3.

At time $T_7$, modulation samples A1 through A4 have been stored in storage locations so as to be properly decoded by processor 110, and modulation sample B4 is stored in queue 151. At time $T_8$, modulation samples B1 and B3 are sent to system memory 125 and modulation sample C1 is received at queue 151. By time $T_9$, the gap in the data stream caused by dropping modulation sample B2 reaches input buffer 127 in system memory 125. Modulation sample B3 is stored in a memory location that will be decoded in phase two. In which case the modulation sample will be decoded incorrectly and the encoded data will be unrecoverable. Moreover, each subsequent modulation sample stored to input buffer 127 in system memory 125 will also be out of phase. Thus, until the error is detected, the data will be unrecoverable.

Figure 7:
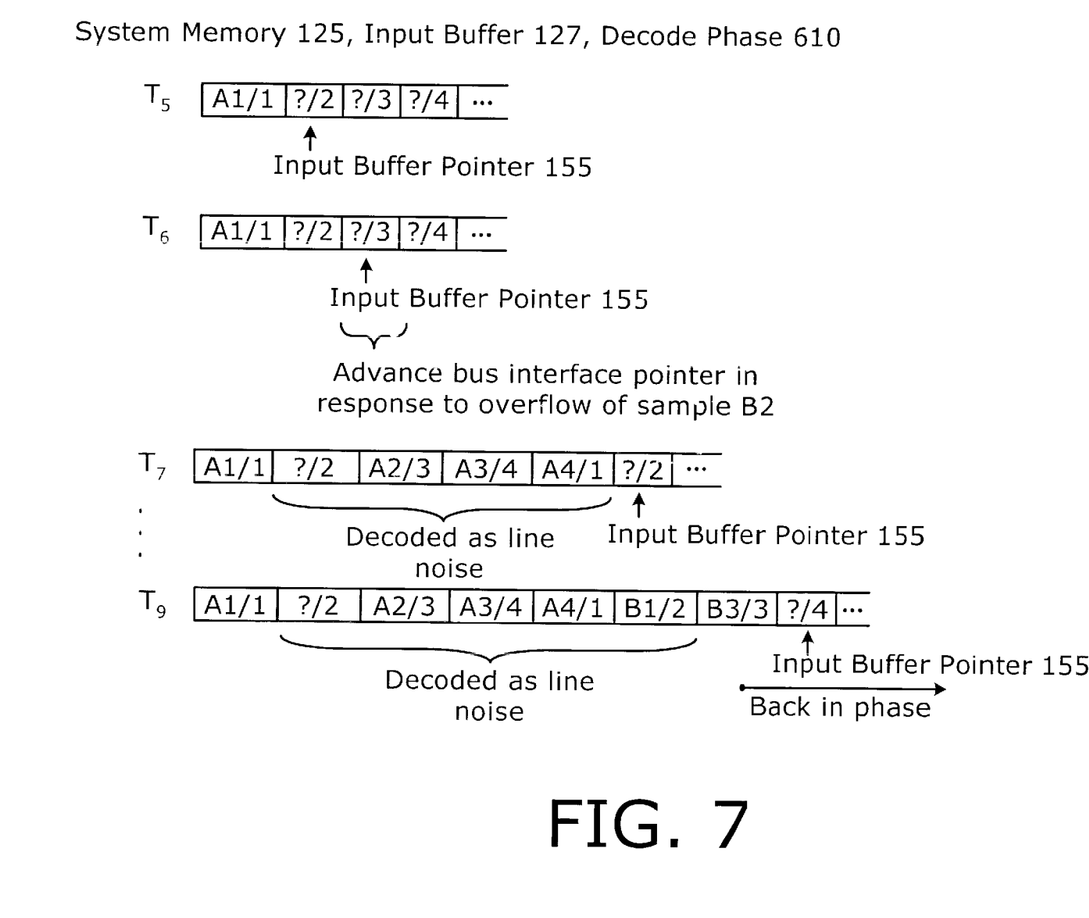
FIG. 7 illustrates one embodiment of the present invention for queue overflow.

FIG. 7 illustrates one embodiment of the present invention. For each modulation sample of data received at input queue 151, input buffer pointer 155 is advanced to the next available storage location even if the modulation sample of data is dropped or the modulation sample overwrites an existing modulation sample in queue 151. For instance, picking up from FIG. 6 at time $T_5$, modulation sample A1 has been stored to input buffer 127 in system memory 125 and input buffer pointer 155 points to the next storage location in system memory 125. By time $T_6$, the overflow condition has caused input buffer pointer 155 to be advanced one memory location even though no modulation sample of data was sent from queue 151.

At time $T_7$, when modulation samples A2, A3, and A4 have reached input buffer 127 in system memory 125, all three modulation samples are "out of phase" and will be decoded incorrectly such that the encoded data will be unrecoverable. By time $T_9$ however, when the gap in the data stream reaches input buffer 127 in system memory 125, the data stream is back "in phase" starting with modulation sample B3. The contents of the skipped memory location(s) and the modulation samples that are decoded in the wrong phase will likely be interpreted as line noise by higher level software.

Figure 8:
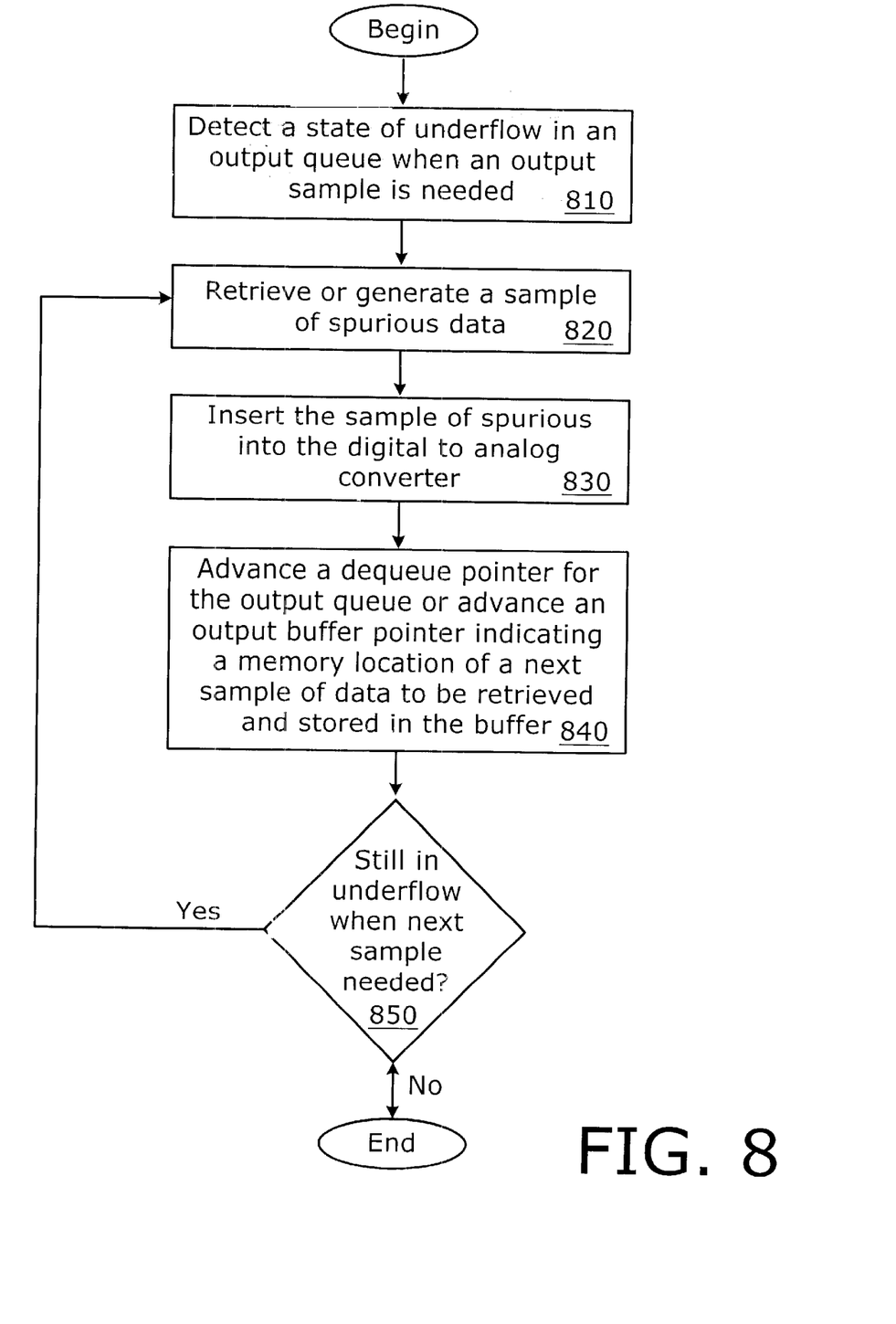
FIG. 8 demonstrates the process of one embodiment of the present invention for queue underflow.

FIG. 8 illustrates the process of one embodiment of the present invention for buffer underflow. In block 810, a state of underflow is detected in an output queue when a modulation sample is needed for output. As discussed above, the state of underflow can be detected in any number of ways, including comparison of queue pointers. In block 820, a spurious modulation sample is obtained. In various embodiments, the spurious modulation sample could be an arbitrary modulation sample from the output queue or it could be generated on the fly.

In block 830, the spurious modulation sample is inserted into the digital to analog (D/A) converter for conversion to analog waveform. In block 840, control logic advances a pointer in order to ensure that a modulation sample will be skipped in the output queue when new modulation samples are received so as to maintain synchronization for subsequent modulation samples. For instance, in the illustrated embodiment, either a dequeue pointer is advanced in response to the spurious modulation sample or an output buffer pointer is advanced in response to the spurious modulation sample. The output buffer pointer indicates from where in memory to retrieve a next modulation sample of data to be stored in the output queue.

In block 850, if the queue is still in a state of underflow when the time comes to send the next modulation sample, the process returns to block 820. If the queue is not in a state of underflow, the process ends, and modulation samples are sent from the output buffer in a normal fashion. In which case, synchronization is maintained for subsequent modulation samples of data.

Figure 9:
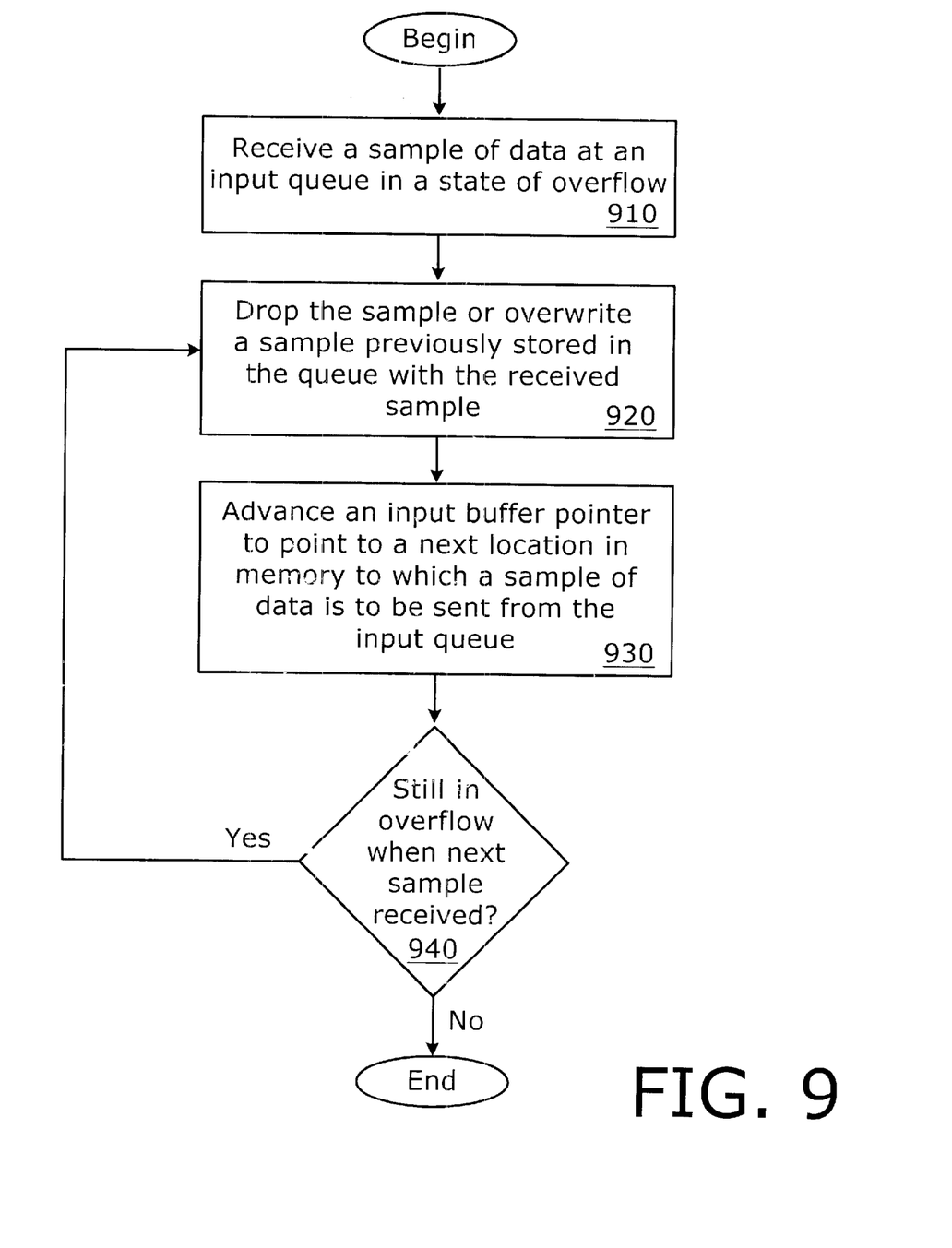
FIG. 9 demonstrates the process of one embodiment of the present invention for queue overflow.

FIG. 9 illustrates the process of one embodiment of the present invention for buffer overflow. In block 910, a modulation sample of data is received at an input queue when the queue is in a state of queue overflow. In block 920, a gap in the data stream is created when either the modulation sample is dropped or the modulation sample overwrites a modulation sample that was previously stored in the queue (which has not yet been written to the input buffer in memory). In block 930, an input buffer pointer is advanced to point to the next location in the input buffer in memory to which a modulation sample of data is to be sent from the input queue. That is, a memory location in the input buffer will be skipped in response to the gap in the data stream. As discussed above, the modulation samples stored in several memory locations immediately following the skipped memory location will not be recoverable, but eventually synchronization will be restored for subsequent modulation samples.

In block 940, if the queue is still in a state of queue overflow when the next modulation sample of data is received at the input queue, the process will return to block 920. If the buffer is not in a state of overflow, the process will end and modulation samples of data will be received and sent to the input buffer in memory in a normal fashion. Although a few modulation samples will be "out of phase" and thus decoded as line noise, synchronization will be restored for subsequent modulation samples.

Figure 10:
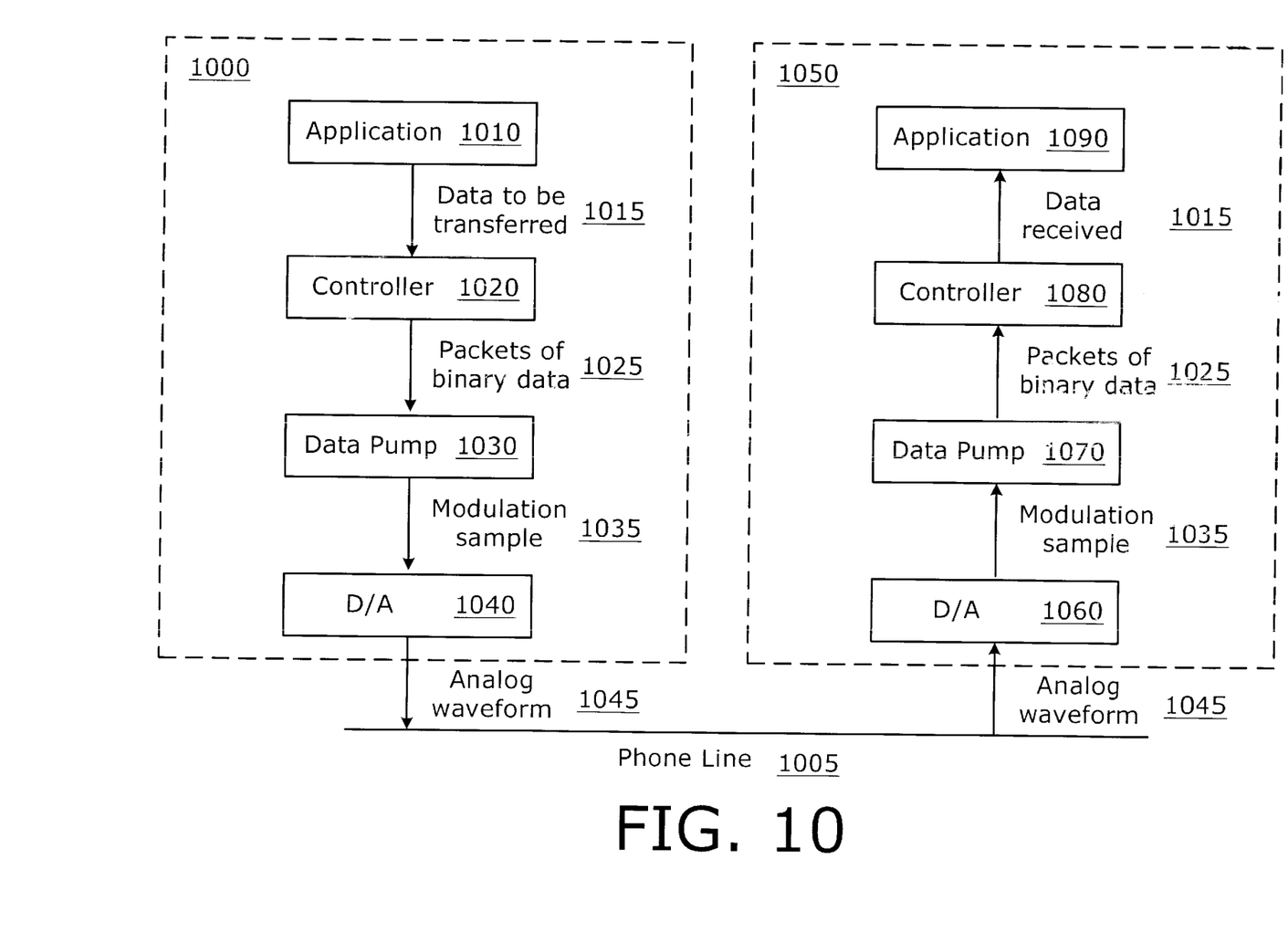
FIG. 10 illustrates one embodiment of a transmitting software modem and a receiving software modem.

FIG. 10 illustrates one embodiment of a data transmission according to the teachings of the present invention between a first system 1000 and a second system 1050 using software modems. An application 1010 generates data to be transferred 1015. Controller 1020 packetizes the data and provides the packets of binary data 1025 to datapump 1030. Datapump 1030 generates modulation samples 1035 using, for instance, the four phase modulation scheme discussed above. Application 1010, controller 1020, and datapump 1030 are all executed in software by, for instance, processor 110 of FIG. 1, and modulation samples 1035 are stored in system memory 125 in output buffer 128 prior to transmission to the receiving modem.

Modulation samples are converted into an analog waveform 1045 at a constant rate by digital-to-analog (D/A) converter 1040. D/A converter 1040 may include, for instance, the hardware of modem card 140 in FIG. 1. Analog waveform 1045 travels over phone line 1005 to analog-to-digital (A/D) converter 1060 in system 1050. In one embodiment, system 1050 is a mirror image of system 100. Analog-to-digital (A/D) converter 1060 recovers the modulation samples 1036. Modulation samples 1036 at the output of A/D converter 1060 may not be identical to samples 1035. For instance, there could be a different number of modulation samples 1036 per symbol than there are modulation samples 1035 per symbol. The received modulation samples are stored in an input buffer, such as input buffer 127 in memory 125 of FIG. 1. Datapump 1070 recovers the packets of data 1025 using the modulation scheme discussed above. Controller 1080 recovers the data received 1015 and provides the data to application 1090.

In the prior art, an out-of-phase error would not be noticed until the data reaches controller 1080. Any data in the "pipeline" between D/A converter 1040 and controller 1080 between the time of the error and the time the error is detected would be unrecoverable data. Because each packet of binary data 1025 encoded by datapump 1030 comprises a number of modulation samples 1035, the "pipeline" of modulation samples will in general be hundreds or even thousands of samples long. Furthermore, since each modulation sample commonly represents more than one bit of binary data, thousands or even tens of thousands of bits of binary data will in general be unrecoverable in the prior art. The present invention, however, makes it possible to recover from a gap in a data stream and maintain synchronization for subsequent modulation samples with only a small number of bits of binary data being incorrectly received. With modern error correcting codes, such errors may be recoverable at the packet level with no loss in transmission efficiency. Even without error correction, fewer data packets will be dropped or require retransmission.

Those skilled in the art will recognize that the present invention is applicable to a wide variety of real-time processes. For instance, the present invention is applicable to a software based digital subscriber line (DSL), integrated services digital network (ISDN), Ethernet, token ring, as well as "non-modem" type applications.

Figure 11:
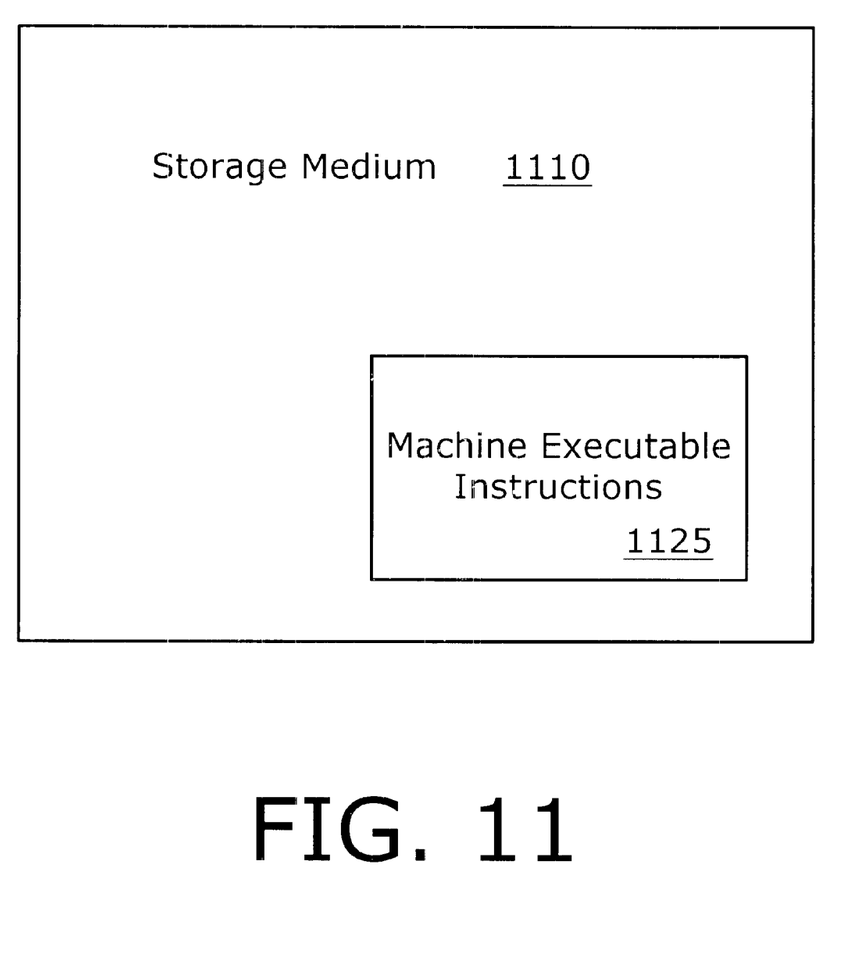
FIG. 11 illustrates one embodiment of machine executable instructions stored on a machine readable storage medium according to the present invention.

The functions of the present invention can be embodied as a series or sequence of machine executable instructions executed by hardware, such as instructions 129 stored in memory 125 executed by processor 110 and/or control logic 170 of FIG. 1. Alternately, as shown in FIG. 11, machine executable instructions 1125, representing the function of the present invention, could be stored on distribution storage medium 1110, such as a CD ROM, a digital video or versatile disk (DVD), or a magnetic storage medium like a floppy disk or tape. The instructions could also be downloaded from a local or remote network server as a propagated signal through any of a number of mediums including wired connections, fiber optic connections, and wireless connections.

Alternately, the present invention could be implemented in any number of additional hardware machines in which a buffer is used in real-time data processing. For instance, one or more ASICs (application specific integrated circuits) could be endowed with some or all of the functionality of the present invention, and inserted into system 100 of FIG. 1 as additional components not shown, or combined with one or more other components.

Thus, a method and apparatus for real-time processing of a synchronous or isochronous data stream in the presence of gaps in the data stream due to queue underflow and/or overflow is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   transmitting a spurious data sample in place of a first data sample to be sent from a queue if the queue is in a state of underflow during which said first data sample is not available to be transmitted, said queue to store data samples for a data transmission from a modem; and
   advancing a pointer to skip said first data sample when said first data sample becomes available in said queue to preserve synchronization for subsequent data samples transmitted from said queue.

2. The method of claim 1 wherein transmitting said spurious data sample in place of said first data sample to be sent from said queue if said queue is in said state of underflow, said queue to store data samples for said data transmission from said modem, comprises transmitting said spurious data sample in place of said first data sample to be sent from said queue if said queue is in said state of underflow, said queue to store data samples for a data transmission from a software modem.

3. The method of claim 1 wherein advancing the pointer to skip said first data sample when said first data sample becomes available in said queue comprises:
   advancing a dequeue pointer to point to a next location in said queue, said dequeue pointer to indicate a location in said queue from which a next data sample is to be sent.

4. The method of claim 1 wherein advancing the pointer to skip said first data sample when said first data sample becomes available in said queue comprises:
   advancing an output buffer pointer to point to a next location in a memory, said output buffer pointer to indicate a location in the memory from which a next data sample is to be retrieved and stored in said queue.

5. The method of claim 1 wherein transmitting the spurious data sample in place of the first data sample comprises transmitting one of contents of a storage location in the queue, a modulation sample of all zeros, and a modulation sample of all ones.

6. The method of claim 5 wherein transmitting said spurious data sample in place of said first data sample to be sent from said queue if said queue is in a state of underflow during which said first data sample is not available to be transmitted, said queue to store data samples for a data transmission comprises transmitting said spurious data sample in place of said first data sample to be sent from said queue if said queue is in a state of underflow during which said first data sample is not available to be transmitted, said queue to store data samples for an isochronous data transmission.

7. The method of claim 5 wherein transmitting the contents of the storage location in the queue comprises transmitting a data sample previously sent from the buffer.

8. The method of claim 1 wherein transmitting the spurious data sample comprises:
   detecting the state of underflow;
   obtaining the spurious data sample; and
   inserting the spurious data sample into the data transmission.

9. The method of claim 8 wherein obtaining the spurious data sample comprises one of:
   retrieving the spurious data sample from a storage location; and
   generating the spurious data sample.

10. The method of claim 6 wherein transmitting said spurious data sample in place of said first data sample to be sent from said queue if said queue is in said state of underflow during which said first data sample is not available to be transmitted, said queue to store data samples for said isochronous data transmission comprises transmitting said spurious data sample in place of said first data sample to be sent from said queue if said queue is in said state of underflow during which said first data sample is not available to be transmitted, said queue to store data samples for a synchronous data transmission.

11. The method of claim 1 wherein transmitting the spurious data sample in place of the first data sample to be sent from the queue if the queue is in the state of underflow comprises transmitting the spurious data sample in place of the first data sample to be sent from the queue if the queue has no new data samples stored in the queue at a time when the first data sample is required to be sent from the queue.

12. The method of claim 11 wherein the state of underflow is due to bus contentions preventing the new data samples from being retrieved from a memory and stored in the queue.

13. A method comprising:
receiving a data sample at a queue, said queue being in a state of overflow, and said data sample being part of a data transmission from a modem; and
advancing an input buffer pointer to point to a next location in a memory in response to receiving the data sample to preserve synchronization for subsequent data samples, said input buffer pointer to indicate a location in the memory to which a next data sample is to be sent from the queue.

14. The method of claim 13 wherein the data transmission comprises a transmission to a software modem.

15. The method of claim 13 wherein receiving the data sample comprises one of:
dropping the data sample; and
overwriting a data sample previously stored in the queue.

16. The method of claim 13 wherein the state of overflow comprises having no storage space available in the queue at a time the data sample is received.

17. The method of claim 13 wherein advancing the input buffer pointer comprises:
detecting the state of overflow; and
incrementing a register value representing the input buffer pointer.

18. The method of claim 13 wherein the state of overflow is due to bus contentions preventing data samples from being sent from the queue to the memory.

19. An apparatus comprising:
an output device to send a spurious data sample in place of a first data sample to be sent from a queue if said queue is in a state of underflow during which said first data sample is not available to be sent, said buffer to store data sample for a data transmission from a modem; and
circuitry to advance a pointer to skip said first data sample when said first data sample becomes available in the queue to preserve synchronization for subsequent data samples sent from said queue.

20. The apparatus of claim 19 wherein the circuitry to skip the first data sample comprises:
a dequeue pointer to advance to a next location in the buffer, said dequeue pointer to indicate a location in the queue from which a next data sample is to be sent.

21. The apparatus of claim 19 wherein the circuitry to skip the first data sample comprises:
an output buffer pointer to advance to a next location in a memory, said output buffer pointer to indicate a location in the memory from which a next data sample is to be retrieved and stored in the queue.

22. The apparatus of claim 19 wherein the spurious data sample comprises one of contents of a storage location in the buffer, a modulation sample of all zeros, and a modulation sample of all ones.

23. The apparatus of claim 19 wherein the output device comprises:
control logic to detect the state of underflow in the buffer, obtain the spurious data sample, and insert the spurious data sample in the data transmission.

24. An apparatus comprising:
an input device to advance an input buffer pointer to point to a next location in a memory in response to receiving a data sample at a queue while in a state of overflow to preserve synchronization for subsequent data samples, said input buffer pointer to indicate a location in the memory to which a next data sample is to be sent from the queue, said queue to store data samples for a data transmission from a modem.

25. The apparatus of claim 24 wherein to advance the input buffer pointer, the input device is to detect the state of overflow, and increment a register value representing the input buffer pointer.

26. A machine readable storage medium having stored thereon machine executable instructions, the execution of which to implement a method comprising:
transmitting a spurious data sample in place of a first data sample to be sent from a queue if said queue is in a state of underflow during which said first data sample is not available to be sent, said queue to store data samples for a data transmission from a modem; and
advancing a pointer to skip said first data sample when said first data sample becomes available in said queue to preserve synchronization for subsequent data samples sent from said queue.

27. A machine readable storage medium having stored thereon machine executable instructions, the execution of which to implement a method comprising:
receiving a data sample at a queue, said queue being in a state of overflow, and said data sample being part of a data transmission from a modem; and
advancing an input buffer pointer to point to a next location in a memory in response to receiving the data sample to preserve synchronization for subsequent data samples, said input buffer pointer to indicate a location in the memory to which a next data sample is to be sent from the queue.

28. The method of claim 6 wherein transmitting the spurious data sample comprises:
obtaining a phase dependent spurious data sample dependent upon a current phase of the isochronous data transmission; and
inserting the phase dependent spurious data sample into the isochronous data transmission.

29. The apparatus of claim 19, wherein the data transmission comprises an isochronous data transmission.

30. The apparatus of claim 24, wherein the data transmission comprises an isochronous data transmission.

31. The machine readable storage medium of claim 26, wherein the data transmission comprises an isochronous data transmission.

32. The machine readable storage medium of claim 27, wherein the data transmission comprises an isochronous data transmission.

* * * * *